Dec. 27, 1966          J. J. MARTIN          3,294,420

COUPLING ARRANGEMENT FOR TANDEM AXLE SEMI-TRAILERS

Filed May 3, 1965          4 Sheets-Sheet 1

INVENTOR

JOHN J. MARTIN

BY Fred P. Kostka

ATT'Y.

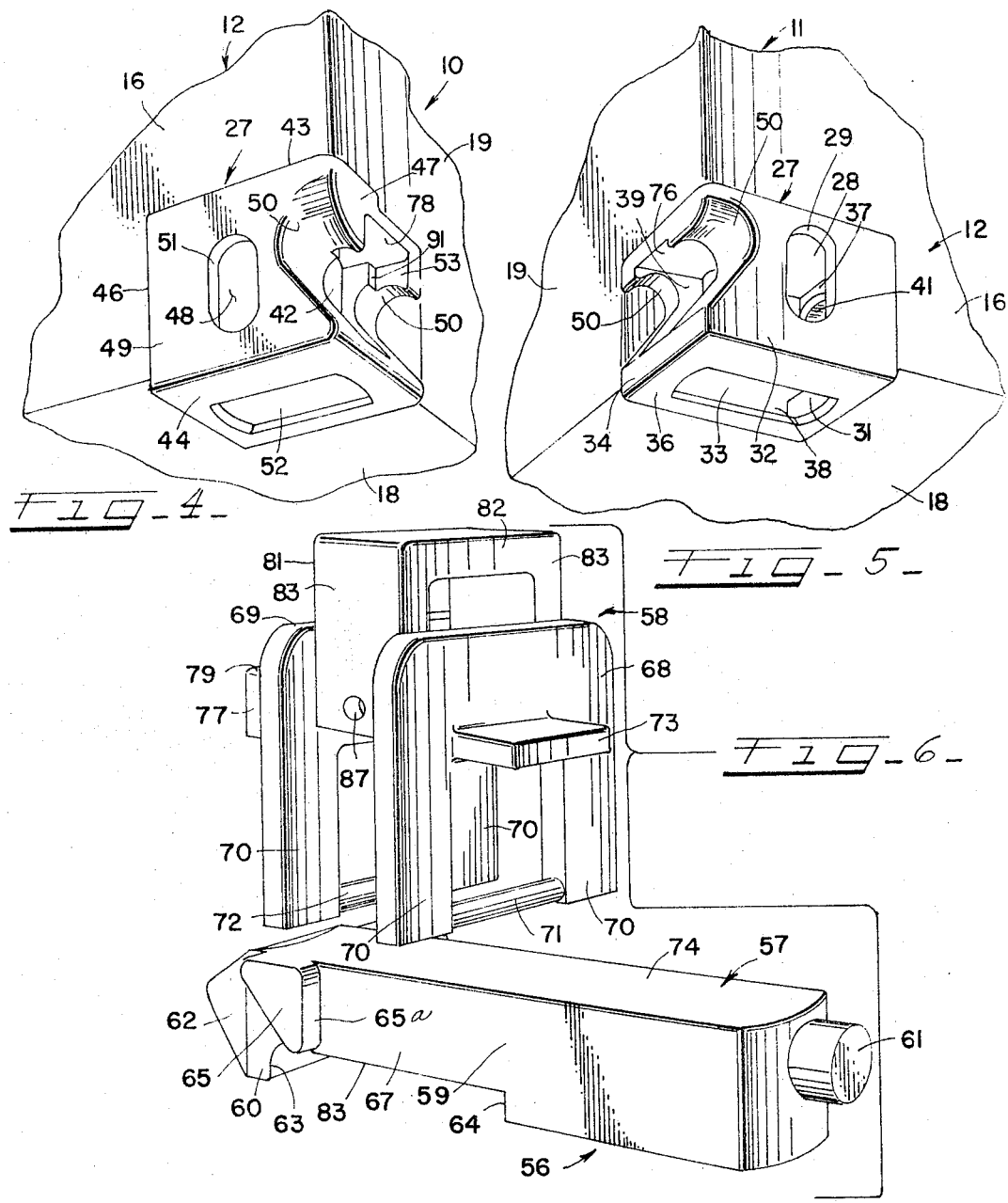

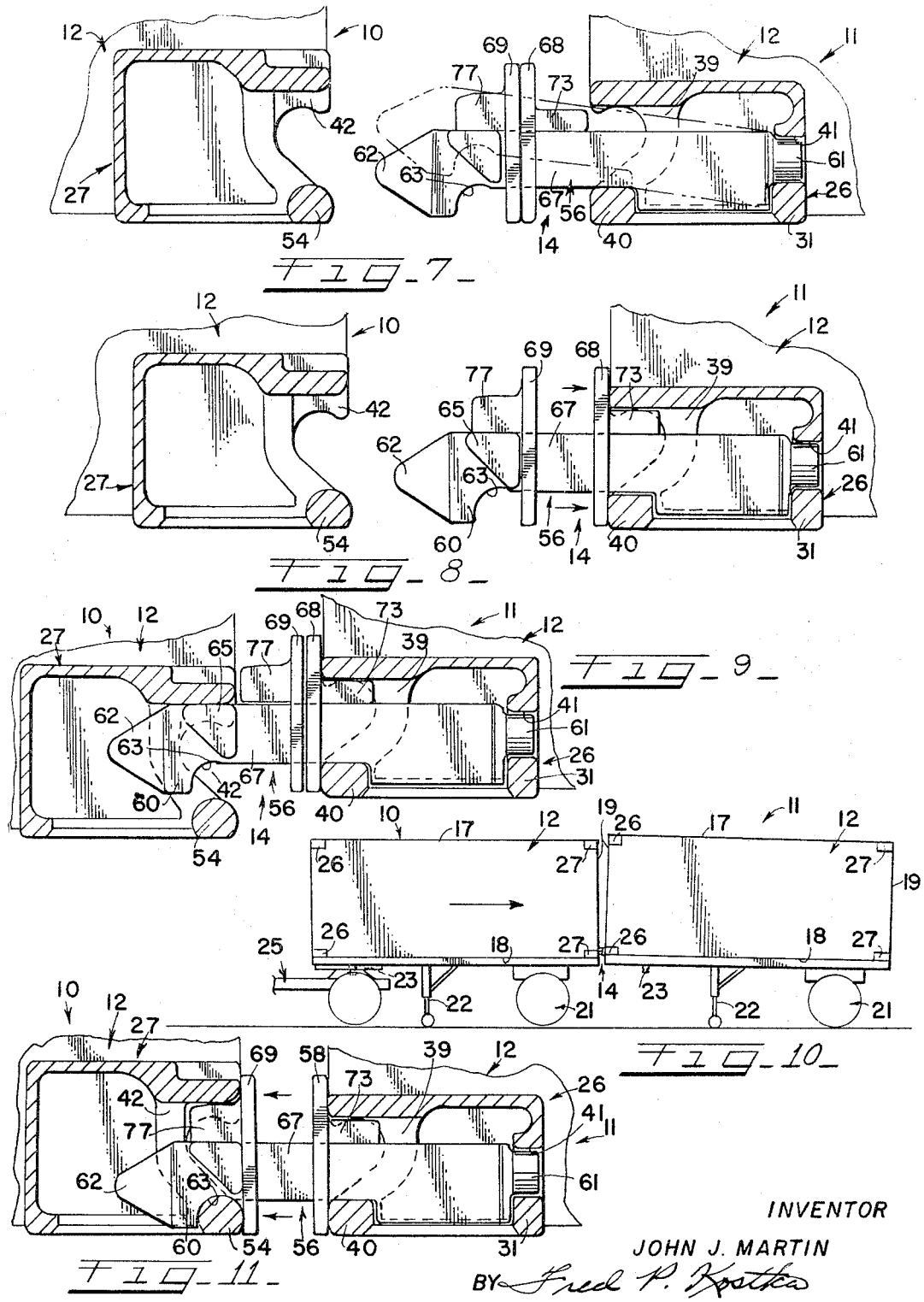

Dec. 27, 1966                J. J. MARTIN                3,294,420
            COUPLING ARRANGEMENT FOR TANDEM AXLE SEMI-TRAILERS
Filed May 3, 1965                                    4 Sheets-Sheet 4
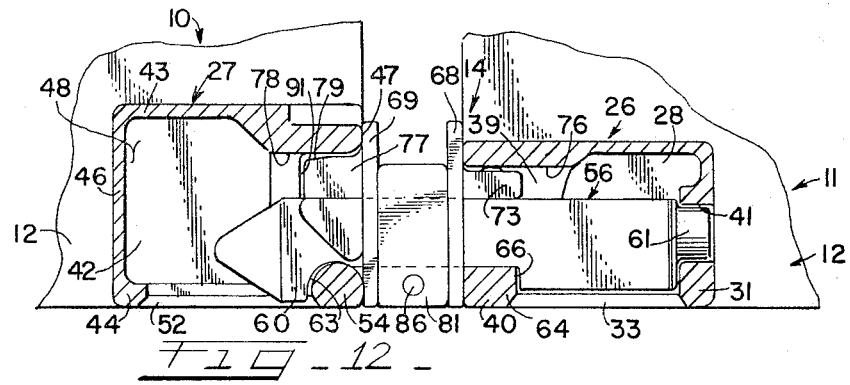
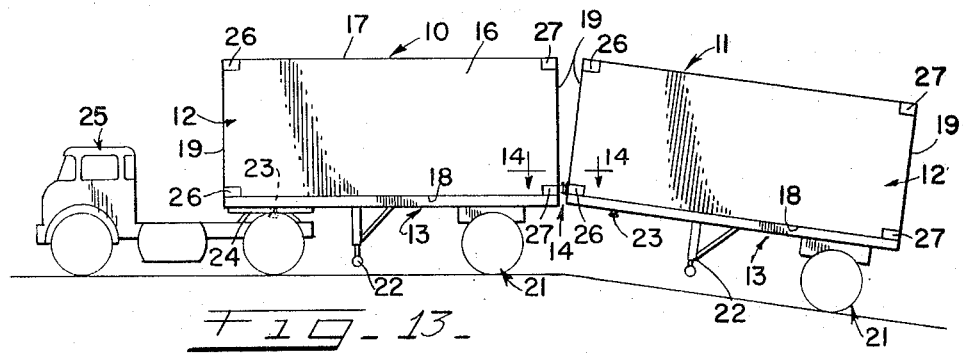
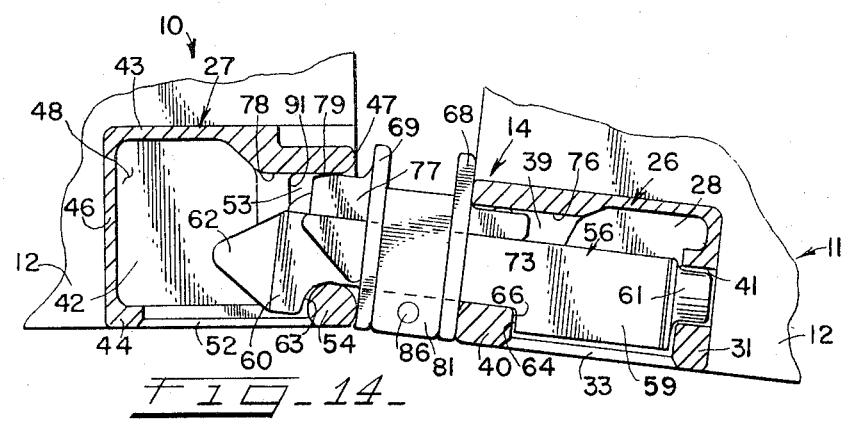
INVENTOR
JOHN J. MARTIN
BY *Fred P. Kostka*
ATT'Y.

United States Patent Office 3,294,420
Patented Dec. 27, 1966

3,294,420
COUPLING ARRANGEMENT FOR TANDEM AXLE
SEMI-TRAILERS
John J. Martin, Weatherly, Pa., assignor to Pullman Incorporated, Chicago, Ill., a corporation of Delaware
Filed May 3, 1965, Ser. No. 452,563
4 Claims. (Cl. 280—415)

The present invention relates to semi-trailers of the general type including a chassis and a van cargo body detachably mounted thereon and, more particularly, to a new and improved arrangement for coupling the semi-trailers of the foregoing type for tandem operation over the road.

The van cargo bodies or containers which are detachably mounted or secured to the chassis of the semi-trailer are adapted and constructed to be suitable for universal interchange among various modes of transportation such as rail, marine, air and highway. The van cargo bodies, to meet the requirements of this universal interchange of transportation, are of standardized dimensions, generally about 8′ x 8′ x 20′, which renders the over the road operation of a single van body somewhat uneconomical. Accordingly, it is common practice to employ a pair of semi-trailers, each containing a detachable container body thereon, connected in tandem so as to render the over the road operation more economical. It is the arrangement for coupling in tandem the semi-trailers of the general type employing detachable van bodies with which the present invention is primarily concerned.

It is a principal object of the present invention to provide a new and improved coupling arrangement for connecting the semi-trailers of the above described type in tandem.

It is a further object to provide a coupling arrangement for connecting in tandem semi-trailers of the general type above described wherein the coupling occurs at the lower corner brackets forming a part of the container or cargo van construction.

It is still another object to provide a coupling arrangement for tandem connection of two semi-trailers having detachably mounted containers thereon, wherein the coupling arrangement occurs at the lower corner brackets and is constructed and arranged so as to permit relative hinging movement of the two tandem connected semi-trailers.

It is still another object to provide a coupling arrangement which is economical and of simple construction so as to facilitate the attachment of the semi-trailers in tandem.

In the drawings:

FIG. 4 is a fragmentary perspective view of one of the rear corner brackets of the container on the forward semi-trailer of FIG. 1;

FIG. 5 is a fragmentary perspective view of one of the front corner brackets of the container on the rear semi-trailer of FIG. 1;

FIG. 6 is an exploded view of the coupling means employed to couple the semi-trailers in tandem at the adjacent front and rear corner brackets of the containers detachably mounted on the respective semi-trailers;

FIG. 7 is an enlarged fragmentary view of the adjacent corners of the containers mounted on the front and rear semi-trailers of FIG. 1 and showing the relative spacing between the semi-trailers with the tie member of the coupling arrangement in its initially inserted position;

FIG. 8 is a view similar to FIG. 7 but showing the position of the slidable members of the locking means prior to the connection of the coupling arrangement with the rear corner bracket of the foremost semi-trailer;

FIG. 9 is a view similar to FIG. 7 but showing the relative positions of the front and rear semi-trailers with tie member inserted into the rear corner brackets of the front semi-trailer;

FIG. 10 is a side elevational view showing the relative positions of the front and rear semi-trailers to accomplish the connection shown in FIG. 9;

FIG. 11 is a cross sectional view similar to FIG. 9 but showing the position of the tie member with the rear corner bracket of the front semi-trailer and the front corner bracket of the rear semi-trailer when the latter is in its lowered position;

FIG. 12 is a cross sectional view similar to FIG. 11 but showing the locking means in the operative locked position thereof;

Figure 1:
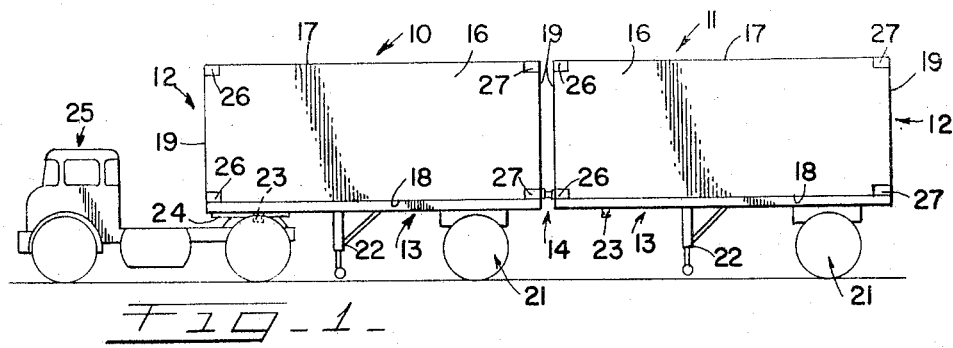
FIG. 1 is a side elevational view of two semi-trailers of the type having a van body detachably fastened on the respective semi-trailer chassis and incorporating the coupling arrangements of the present invention.

FIG. 13 is a side elevational view of two semi-trailers connected in tandem and incorporating the coupling arrangement of the present invention and showing in particular how the coupling arrangement permits relative vertical hinging between the front and rear semi-trailers when the latter are on different grades; and FIG. 14 is enlarged cross sectional view taken generally along the lines 14—14 of FIG. 13 to show the relative positions of the coupling arrangement components when the front and rear semi-trailers are on different grades.

Referring now to the drawings, there is shown a front semi-trailer 10 and a rear semi-trailer 11 each being of the general type having a van cargo body or container 12 which is detachably mounted on a respective semi-trailer chassis 13. The front and rear semi-trailers 10 and 11 are detachably secured for tandem operation for over the road operation by means of a coupling arrangement 14 which embodies the principles of the present invention.

The containers 12 are each of similar structure and are of the type generally used for universal interchange among marine, air, rail or highway forms of transportation. The containers 12 are generally rectangular with nominal dimensions of 8′ x 8′ x 20′ and comprise side walls 16, a top wall 17, and a lower or bottom wall 18, and end walls 19. Conventionally, there is substantially no reinforcement employed in the formation of the sheet metal sides of the container 12 so that it may be designated as being substantially frameless. Conventionally, the underside or bottom wall 18 of the container 12 is provided with recuring tracks 15 having openings 15a which receive a retractable latching mechanism 20 mounted on the chassis frame 13 for attaching the container thereon.

The chassis 13 is of substantially rectangular open frame structure and includes the conventional components (not shown) to coact with other attachment structure (not shown) which may be on the underside or bottom wall 18 of the container body 12. Fastened to the chassis 13 at the rear ends thereof is a wheeled bogie 21, and intermediate the end is a retractable landing gear 22 of more or less conventional construction and which serves to raise and lower the semi-trailers. The forward end of the chassis 13 is also provided with a king pin 23 for attachment to the fifth wheel plate 24 carried by the tractor 25 which serves to haul the semi-trailer over the road.

In accordance with the present invention the semi-trailers 10 and 11 with the containers 12 secured to the respective chassis are connected in tandem by the coupling arrangement 14 which provides a hinge connection between the two semi-trailer cargo van bodies 12. To this end, as shown, each of the containers 12 is provided with a set of front corner brackets 26 which are disposed along each of the front corners defined by the forward end wall 19 and the side wall 16 and a set of rear corner brackets 27 along the lower corners defined at the side wall 16 and the end wall 19. The upper corners of the containers 12 may similarly be provided with front and rear corner brackets 26 and 27, respectively.

As shown in particular in FIGS. 2, 4, 7–9, 11, 12 and 14 the front corner brackets 26 are each of substantially rectangular box like structure formed as by casting and having an internal cavity or chamber 28 defined by a top wall 29, a rear wall 31, an exterior side wall 32, an interior side wall 33, a front wall 34, and a bottom wall 36. The front corner brackets 26 are each secured to the corners of the container 12 as by welding so that the exterior side wall 32 lies along the side wall 16 and the bottom wall 36 lies along the container bottom wall 18 and the front wall 34 and flush with the end wall 19. The exterior wall 32 is provided with an elongate opening 37 and the wall 36 is formed with a second elongate slot 38. The openings 37 and 38 may receive indexing mechanism or locking means which are available on the various support structures utilized on the different modes of transportation on which the container may be transported. The front or end wall is formed with substantially rectangular opening 39 communicating with the chamber 28 and which is defined along the bottom by a retaining bar 40. The rear wall 31 is formed with a pilot opening 41 which is adapted to receive the pilot end of the locking mechanism 57, as more fully to be described hereinafter.

Figure 2:
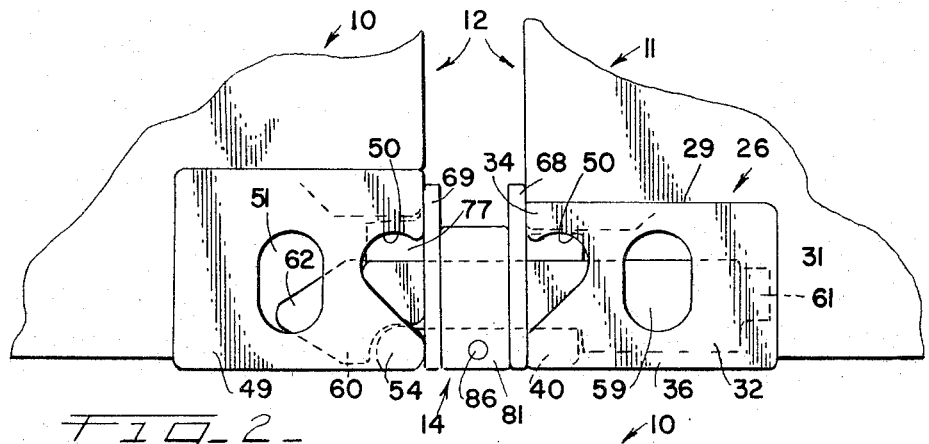
FIG. 2 is a fragmentary elevational view of the coupling arrangement employed in FIG. 1.
Figure 3:
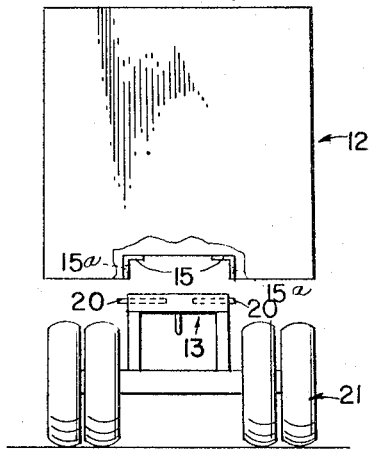
FIG. 3 is a schematic end elevational view of the van cargo body being lowered in position on the semi-trailer chassis.

The rear corner brackets 27 at the intersections of the side walls 16, bottom wall 18 and top wall 17 with the rear wall 19 of the containers 12 are also of a generally boxlike structure but may be of greater height than the front corner brackets 26 shown for example in FIG. 2. The rear corner brackets 27 include a chamber 42 which is defined by a top wall 43, bottom wall 44, an interior end wall 46, exterior front wall 47, interior side wall 48, and an exterior side wall 49. The exterior side wall 49 similar to the side wall 32 of the front corner bracket may be formed with an elongate opening 51 and the bottom wall 44 with an opening 52. The openings 51 and 52 are adapted to receive the locking or indexing means generally described above in connection with the front corner brackets. The exterior front wall 47 is formed with a rectangular opening 53 which communicates with the chamber 48 and is defined along its lower edge by a clamping bar 54 of substantially circular section.

The front corner brackets 26 and rear corner brackets 27 are each formed along the respective side walls 32 and 33 and side walls 48 and 49 at the front walls 34 and 47 with grappling hook receiving slots 50. The slots 50 extend the full width of the corner bracket side walls adjacent the openings 39 and 42 to facilitate the attachment of the grappling hook thereon.

Referring now in particular to FIG. 6, there is shown the coupling means 56 which includes tie member 57 and a locking assembly 58 for retaining the tie member 57 in operative tandem connecting position as shown, for example, in FIGS. 2, 12 and 14. The tie member 57 may be formed with a body portion 59 of substantially rectangular section along its length. At one end the body portion 59 may be provided with a pilot projection 61 of substantially circular section and is adapted to be loosely accommodated within the pilot opening 41 in the rear wall 31 of the front corner brackets 26. The other end of the tie member 57 may be formed with a substantially pyramidal shaped forward end 62 which is adapted to be inserted through the opening 53 in the rear corner bracket 27. Spaced inwardly of the end 62 is a hook portion 60 which is formed with a concave circular surface 63 complementary to the circular surface of the clamping bar 54. Formed on each side of the body 59 inwardly of the end 62 are abutment projections 65 which are disposable within the grappling hook slots 50 of the rear corner bracket 27 grappling hook slots 50—50 and engageable with the side walls 48 and 49. On the inner side the abutment projections 65 are each formed with a substantially vertical shoulder 65a. Spaced lengthwise and inwardly from the clamping bar engaging surface 63 is a shoulder 64 which as shown in FIG. 2 is adapted to seat against the inner surface 66 of the tie bar 40.

As shown, the section 67 of the tie member 57 between the clamping surface 63 and abutment surface 64 is of lesser height than that of the rectangular openings 39 and 53 in the front corner brackets 26 and rear corner brackets 27. To hold the tie member 57 in the operative connecting position with the hook 60 depressed and in engagement with the clamping bar 54 and the shoulder 64 in engagement with the abutment surface 66 of the tie bar 40, it is necessary to substantially fill the remaining space in the rectangular openings 39 and 53. To this end the locking device 58 includes two relatively slidable members 68 and 69 which are each of more or less U-shaped configuration with the legs 70—70 thereof spanning the sides of the body section 67 of the time member 57. Retaining the slide members 68 and 69 on the body section 67 are slide bars 71 and 72 which are fixed between the lower end of the respective legs 70—70.

Projecting outwardly from the slide member 68 is a ledge 73 which is slidable over the upper surface 74 of the tie member 57. The ledge 73 is of sufficient thickness to fill the space between the upper surface 74 of the time member 57 and the inner wall 76 of the opening 39 so as to maintain the time member depressed as shown in FIG. 8.

The other slide member 69 is similarly formed with an inwardly projecting ledge 77 which may be of greater height than the ledge 73 of the slide member 68 to accommodate the greater space between the top surface 74 of the tie member 57 and the inner wall or top wall 78 of the opening 42. The ledge 77 is formed at its leading edge with a slightly tapered surface 79 for reasons which will become more apparent hereinafter. It is to be noted also that the ledges 73 and 77 are normally loosely fitted within the space between the top surface 74 and the respective inner walls 76 and 78. In the normal operative trailer coupling position the slide bars 68 and 69 are disposed as shown, for example, in FIGS. 2 and 12, with the projections 73 and 77 disposed within the respective openings 39 and 42. To maintain the slide members 68 and 69 in this position there is provided U-shaped locking block 81 comprising a bight portion 82 from which there depends a pair of transversely spaced legs 83. The locking block 81 is disposed over the body portion 67 between slide members 68 and 69 with the lower end of the legs 83 depending below the lower surface 84 of the tie member 57. To retain the locking block 81 in position there is provided a locking pin 86 which is insertable through openings 87 adjacent the terminal ends of leg 83.

Coupling of the two semi-trailers 10 and 11 is accomplished by longitudinally and transversely aligning the semi-trailers 10 and 11 with the rear semi-trailer sufficiently spaced from the front semi-trailer 10 to permit the insertion of the tie member into the front corner bracket 26 as shown in FIG. 7. Insertion of the coupling member 56 is achieved by introducing the tie member 57 through the opening 39 so that the pilot projection 61 is seated within the pilot opening 41. This requires that the tie member 57 initially be canted upwardly as shown in phantom and thereafter, because of the loose fit between the pilot opening 41 and pilot end 61, the tie member 56 is free to assume the full line substantially horizontal position. It is to be noted that in this position the shoulder 64 of the tie member 57 is in substantially abutting relationship with the shoulder 66 of the tie bar so that the tie member 57 is restrained against longitudinal movement relative to the front corner bracket 26. The slide member 68 is then slid in the direction of the arrows as indicated in FIG. 8 so that the projection 73 is disposed in its operative position within the opening 39. Thus, the tie member 57 is restrained against substantial vertical movement with respect to the front corner bracket 26.

To couple the front trailer 10 to the tie member 57 the rear trailer 11 is elevated upwardly by way of the landing gear 22 until the tie member leading end 62 is in substantial alignment with the opening 53 in the rear corner bracket 27 as shown in FIGS. 9 and 10. Thereafter the front trailer 10 is backed rearwardly until the outer end of the abutment stop abuts against a shoulder 91 and the hook portion 63 overlies the clamping bar 54. When the tie member 57 is thus positioned, the rear trailer 11 may be again lowered to a substantially horizontal position by way of the landing gear 22 so that the tie member 57 assumes the position shown in FIG. 11 with the hook 63 in engagement with the clamping bar 54.

The slide member 69 is then moved in the direction of the arrows so that the ledge 77 is inserted within the opening 53 with the terminal end abutting the shoulder 91. As shown in FIG. 12, the slide members 68 and 69 are then spaced sufficiently apart to accommodate the locking block 81 which is inserted therebetween so as to hold slide members 68 and 69 in engagement with the front faces 47 and 34 of the rear and front corner brackets 27 and 26, respectively. To retain the locking block 81 in position the pin or bolt 86 is inserted through the aligned openings 87 located in the lower ends of the legs 83.

The release of the coupling arrangement 14 is accomplished by reversing the procedure described above.

From the foregoing description it should be readily apparent that the coupling arrangement 14 is simply and effectively applied between the two adjacent corner brackets of the containers without the necessity of structurally modifying the container or chassis to connect the semi-trailers in tandem. For over the road transit the foremost semi-trailer 10 is attached to the tractor 25 by way of the king pin 23 gripped by the fifth wheel plate 24 in the usual manner. The retractable landing gear is then elevated clear of the roadway. The weight of the rearmost semi-trailer 11 at its front end is carried by the coupling arrangement 14. Moreover, as shown in FIGS. 13 and 14, the coupling arrangement 14 is constructed so as to permit hinging movement of the front semi-trailer 10 and the rear semi-trailer 11 when they are on different grades and thereby to relieve the bending stresses on the coupling arrangement. The hinging movement is made possible by the complementary engaging curved surfaces of the hook 63 and the clamping bar 54. At the same time, the inclined surface 79 of the ledge 77 provides sufficient clearance from the inner top wall 78 of the opening 53 to permit rocking movement of the hook 63 about the tie bar 54.

What is claimed is:

1. An arrangement for coupling two semi-trailers in tandem comprising a first semi-trailer and a lengthwise spaced second semi-trailer, said first semi-trailer and said second semi-trailer each including a chassis and a substantially frameless rectangular cargo body detachably mounted thereon, said container cargo bodies each having a set of forward corner brackets at the lower corners of the front wall thereof and a set of rear corner brackets at each of the lower corners of the rear wall thereof, said front corner brackets each being of substantially box like construction having an interior chamber, a front corner bracket opening formed along the exterior end wall face of said front corner bracket communicating with said interior chamber, said front corner bracket being defined at the lower end thereof with a retaining bar, said rear corner brackets each being of box like structure and having an interior chamber, a rear corner bracket opening on the exterior end wall face of said rear corner bracket and communicating with said interior chamber, a clamping bar defining the lower end of said front corner opening, said openings in said corner brackets being in substantially transverse and longitudinal alignment for tandem attachment of semi-trailers; coupling means connecting said semi-trailers for tandem operation including a tie member having an abutment means insertable through said front corner bracket opening for engagement with said retaining bar, said hook member including a lengthwise spaced hook means insertable through said rear corner bracket opening and engageable with said clamping bar, and locking means movably disposed over said hook member between the adjacent exterior faces of said front and rear corner brackets of said first and second semi-trailers for retaining said abutment means and said hook means in engagement with said retaining bar and clamping bar, respectively.

2. The invention as defined in claim 1 wherein said clamping bar and said hook means are formed with complementary surfaces so as to permit limited relative vertical tilting of said first semi-trailer and said second semi-trailer.

3. The invention as defined in claim 2 wherein said tie member is formed of lesser height than said front corner openings and said rear corner openings, and wherein said locking means includes lengthwise movable means insertable into said front corner opening and said rear corner opening in overlying relationship with said tie means for retaining said abutment means and said hook means in engagement with said retaining bar and clamping bar, respectively.

4. The invention as defined in claim 3 wherein said lengthwise movable means includes two separate members insertable into said front corner opening and said rear corner opening, and wherein said locking means further includes a spacer member insertable between said lengthwise movable means for maintaining said members in said front corner bracket opening and said rear corner bracket opening.

References Cited by the Examiner

UNITED STATES PATENTS

| | | | |
|---|---|---|---|
| 3,004,772 | 10/1961 | Bohlen et al. | 280—415 |
| 3,086,673 | 4/1963 | Tantlinger et al. | 220—1.5 |
| 3,092,282 | 6/1963 | Tantlinger et al. | 220—1.5 |
| 3,102,738 | 9/1963 | De Roshia | 280—415 |
| 3,105,703 | 10/1963 | Rittenhouse | 280—415 |
| 3,132,883 | 5/1964 | Tantlinger et al. | 287—108 |

LEO FRIAGLIA, *Primary Examiner.*